United States Patent [19]

Watson, Jr.

[11] 4,246,391

[45] Jan. 20, 1981

[54] PROCEDURE FOR PRODUCTION OF LOWER VISCOSITY RADIATION-CURABLE ACRYLATED URETHANES

[75] Inventor: Stuart L. Watson, Jr., South Charleston, W. Va.

[73] Assignee: Union Carbide Corporation, New York, N.Y.

[21] Appl. No.: 52,192

[22] Filed: Jun. 26, 1979

[51] Int. Cl.$^3$ ............................................. C08G 18/34
[52] U.S. Cl. ......................................... 528/49; 528/75; 528/80; 528/81; 525/404; 525/523; 560/26; 560/115; 560/158
[58] Field of Search ...................... 528/49, 75, 80, 81; 560/26, 115, 158; 525/404, 523

[56] References Cited

U.S. PATENT DOCUMENTS

| Re. 29,131 | 2/1977 | Smith et al. | 204/159.14 |
|---|---|---|---|
| 3,799,896 | 3/1974 | Moss | 521/114 |
| 3,876,726 | 4/1975 | Ford et al. | 528/75 |
| 3,907,865 | 9/1975 | Miyata et al. | 560/26 |
| 3,984,297 | 10/1976 | Morgan | 204/159.22 |

*Primary Examiner*—Maurice J. Welsh
*Attorney, Agent, or Firm*—Stanley Ktorides

[57] ABSTRACT

Radiation-curable acrylated urethanes having a lower viscosity than heretofore achievable without dilution are produced by an improved process that involves first reacting a monohydroxy-functional acrylate with a polyisocyanate followed by the reaction of the product mixture produced with a polyol. The acrylated urethanes so produced are useful in radiation-curable coatings.

8 Claims, No Drawings

PROCEDURE FOR PRODUCTION OF LOWER VISCOSITY RADIATION-CURABLE ACRYLATED URETHANES

BACKGROUND OF THE INVENTION

Coatings play a useful role in the manufacture and use of a great many articles which find wide application in nearly all facets of contemporary life. Until recently, nearly all coatings were applied with the employment of a hydrocarbon based vehicle which evaporated leaving the dried coating on the article which was to be coated. This system met with increasing disfavor as the price of organic solvent increased and as the deleterious environmental effects of the evaporated solvent became better understood. In response, those skilled in the art endeavored to devise systems of coating which avoided use of organic solvents as vehicles. One of the most successful of these systems has been the so-called 100 percent solids coatings compositions which are in essence reactive compositions that are essentially free of volatile solvents and contain diluent molecules that react during the curing process to become a part of the protective coating itself. Among the most successful of these coating compositions have been based on acrylated urethanes. However, one problem with these compositions has been their high viscosity, requiring dilution with volatile reactive diluents to permit application to a substrate. Heretofore acrylated urethane oligomers have been prepared by the reaction of a polyol with a polyisocyanate followed by capping with an hydroxy functional acrylate. A method of making the very useful acrylated urethanes such that they have a lower viscosity than has been heretofore achievable without dilution would be highly desirable.

SUMMARY OF THE INVENTION

It has now been found that acrylated urethanes having lower viscosities than heretofore achievable can be synthesized by an improved process that involves first reacting the acrylate with the polyisocyanate followed by reaction of the intermediate product with a polyol. This new procedure results in acrylated urethanes of significantly improved fluidity which can be incorporated into radiation-curable coatings, often without the need to use volatile and sometimes objectionable diluents.

DESCRIPTION OF THE INVENTION

This invention is a process for the production of acrylate-capped urethane compounds having a lower viscosity than the acrylate-capped urethanes available from heretofore known methods of synthesis.

Acrylated urethanes have heretofore been prepared by the reaction of a polyol with a polyisocyanate followed by capping with a hydroxy functional acrylate or by the simultaneous reaction of a mixture of all the starting materials. The process of this invention involves the initial reaction of the hydroxyl-functional acrylate with the polyisocyanate followed by reaction of the formed intermediate with the polyol. The acrylated urethanes produced by the process of this invention display a significantly lower viscosity than those obtained using the previously known methods. It was completely unexpected and unobvious to discover that modification of the reactions as herein disclosed would have such a pronounced and beneficial effect on the viscosity of the final product.

The hydroxyl-functional acrylate compounds suitable for use in the process of this invention can be defined by the formula:

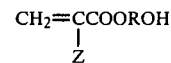

wherein Z is hydrogen or methyl or R is divalent alkylene having from 2 to 6 carbon atoms. Illustrative of these acrylate compounds one can name 2-hydroxyethyl acrylate, hydroproxypropyl acrylate, hydroxypentyl acrylate, hydroxypentyl methacrylate and the like.

The polyisocyanates useful in the process of this invention are the known aliphatic and aromatic polyisocyanates such as 2,4-tolylene diisocyanate, 2,6-tolylene diisocyanate, 4,4'-diphenylmethane diisocyanate, dianisidine diisocyanate, tolidine diisocyanate, hexamethylene diisocyanate, the m- and p-xylylene diisocyanates, tetramethylene diisocyanate, dicyclohexyl-4,4'-methane diisocyanate, cyclohexane-1,4-diisocyanate, 1,5-naphthylene diisocyanate, 4,4'-diisocyanato diphenyl ether, 2,4,6-triisocyanato, toluene, 4,4'4"-triisocyanate triphenyl methane, diphenylene-4,4-diisocyanate as well as any of the other organic polyisocyanates known to the average skilled chemist.

The polyols useful in the process of this invention have an average molecular weight of from 60 to 6000, from 2 to 6 hydroxyl groups and a hydroxyl number of from about 20 mg.KOH/g to about 1000 mg.KOH/g. Illustrative of such polyols one can name poly($\epsilon$-methyl-$\epsilon$-caprolactone) diols, triols, tetrols, poly($\epsilon$-caprolactone) diols, triols, tetrols, polyethyleneoxide diols, triols and tetrols, polyethyleneoxide propylene oxide diols, triols and tetrols, polyadipate polyols and the like.

During the reaction of the isocyanato group, one can have present any of the known urethane catalysts such as amines or tin compounds. These catalysts are well known and include triethylene diamine, morpholine, N-ethyl-morpholine, piperazine, triethanolamine, triethylamine, N,N,N'N'-tetramethylbutane-1,3-diamine, dibutyl tin dilaurate, stannous octoate, stannous laurate, dioctyltin diacetate, lead octoate, stannous oleate, stannous tallate, dibutyl tin oxide and the like. The catalyst, if present, is present in any of the conventional and known catalytically effective amounts sufficient to carry out the urethane synthesis.

The reaction is run at a temperature of from about 10° C. to about 90° C. preferably from about 40° C. to about 60° C. The reaction can be carried out at atmospheric, subatmostpheric or superatmostpheric pressures. The time of the reaction will vary and will depend on the reactants, reaction conditions and batch size. The mole ratios of the reactants will depend on the product desired and the functionality of the reactants. For example, for a diacrylated urethane synthesized from a diisocyanate, a diol, and 2-hydroxypropyl acrylate, the mole ratio would be 2/1/2 respectively.

In accord with the process of this invention the organic polyisocyanate is initially reacted with the hydroxyl-functional acrylate to produce a prepolymer containing free isocyanate groups. This prepolymer is then reacted with the polyol reactant to obtain the desired product. As is shown in the subsequent examples, the final product has significantly lower viscosity and improved fluidity when produced by this procedure. In comparison, when the organic polyisocyanate was initially reacted with the organic polyol followed by the reaction of the intermediate prepolymer, the final product produced had a much higher viscosity and in one instance was a solid.

In a typical embodiment toluene diisocyanate and a reactive diluent such as 2-(N-methylcarbamoyl) oxyethyl acrylate are charged to a flask. While the mixture is stirred, 2-hydroxyethyl acrylate and dibutyl tin dilaurate as catalyst are added and the reaction is permited to proceed. Thereafter, the polyol, such as poly($\epsilon$-methyl-$\epsilon$-caprolactone)diol, is added in a dropwise manner and reacted. An acrylated urethane having a lower viscosity than that obtained through heretofore known processes is obtained.

The products of the process of this invention are acrylate-capped urethane oligomers. These compounds are well known to those skilled in the art and resemble those described in U.S. Pat. No. Re. 29,131.

The acrylated urethane products of the process of this invention find wide use in the formulation of radiation-curable coatings. Now, by use of the process of this invention, these acrylated urethanes of lower viscosity can be incorporated into radiation-curable coating formulations without the great need of volatile and possibly objectionable diluents. Furthermore, by use of the process of this invention certain acrylated urethanes, which could not be satisfactorily prepared using previously known methods, can be synthesized, as shown in the examples.

It was completely unexpected and unobvious to find that acrylated urethanes can be produced by the instant improved process having beneficially lower viscosities than acrylated urethanes produced using heretofore known methods.

The following experiments were conducted for comparative purposes using the conventional method of synthesizing acrylated urethanes.

EXPERIMENT A

There were charged to a two liter, four-neck round bottom flask equipped with a thermometer, mechanical stirrer, air condenser, dry air blanket, dropping funnel and heating mantle 205 grams of toluene diisocyanate, 300 grams of 2-(N-methylcarbamoyl)oxyethyl acrylate as solvent and 0.8 gram of dibutyl tin dilaurate as catalyst. The mixture was heated with stirring to 40° C. for 25 minutes and 358 grams poly($\epsilon$-methyl-$\epsilon$-caprolactone)diol having a hydroxyl number of 185 mg.KOH/g was added dropwise over a 40 minute period and reacted. After completion of this reaction and while the reactants were stirred and kept at from 46° C. to 48° C., 137 grams of 2-hydroxyethyl acrylate was added dropwise. The reaction mixture was then stirred and heated at from 46° C. to 48° C. for seven hours. The acrylate capped polycaprolactone urethane produced had a Brookfield viscosity of 31,000 cps at 25° C.

EXPERIMENT B

There were charged to the apparatus described in Experiment A 145 grams of 1,1-bis-(4-isocyanatocyclohexyl)methane, 150 grams of 2-(N-methylcarbamoyl)oxyethyl acrylate as diluent and 0.4 gram of dibutyl tin dilaurate as catalyst. The mixture was heated with stirring to 40° C. for about 30 minutes and 139 grams of poly($\epsilon$-caprolactone) tetrol having a hydroxyl number of 223 mg.KOH/g was added dropwise over a 15 minute period and reacted. After completion of this reaction and while the mixture was stirred and kept at from 48° C. to 50° C., 66.grams of 2-hydroxyethyl acrylate was added dropwise. The reaction mixture was then stirred and heated at from 40° C. to 50° C. for sixteen hours. Attempts to form the product acrylate capped polycaprolactone urethane into a radiation curable coating were unsuccessful because the product was too viscous.

EXPERIMENT C

There were charged to the apparatus described in Experiment A 283 grams of 1,1-bis(4-isocyanatocyclohexyl)methane, 300 grams of 2-(N-methylcarbamoyl) oxyethyl acrylate as diluent and 0.8 gram of dibutyl tin dilaurate as catalyst. The mixture was heated with stirring to 40° C. for about 30 minutes and 287 grams of a polycaprolactone diol having an average molecular weight of 530 and a hydroxyl number of 212 mg.KOH/g was added dropwise over a 17 minute period and reacted. After completion of this reaction and while the mixture was sitrred and kept at from 46° C. to 49° C., 130 grams of 2-hydroxyethyl acrylate was added dropwise. The reaction mixture was then stirred and heated at from 40° C. to 60° C. for twenty-four hours. The acrylate capped polycaprolactone urethane produced had a Brookfield viscosity of 34,000 cps. at 25° C.

The following examples serve to further illustrate the invention.

EXAMPLE 1

There were charged to a two liter four-neck round bottom flask equipped with a thermometer, mechanical stirrer, air condenser, dry air blanket, dropping funnel and heating mantle 205 grams of toluene diisocyanate and 300 grams of 2-(N-methylcarbamoyl) oxyethyl acrylate as diluent. The reactants were stirred and 137 grams of 2-hydroxyethyl acrylate was added dropwise over a 56 minute period at room temperature. The resultant solution was then stirred for seven hours and then 0.8 gram of dibutyl tin dilaurate as catalyst was added. The reaction mixture was then heated to 40° C. and stirred. After 10 minutes there was added 358 grams of poly(-$\epsilon$-caprol-$\epsilon$-caprolactone) diol having a hydroxyl number of 185 mg.KOH/g. dropwise over a 50 minute period. The mixture was then stirred and heated for about nine hours. The acrylate capped polycaprolactone urethane produced had a Brookfield viscosity of 21,000 cps at 25° C. Comparison with Experiment A, which contained the same components, showed that the acrylated urethane product made by the process of this invention had a viscosity 32 percent lower than that of the product obtained using the heretofore known process.

EXAMPLE 2

There were charged to the apparatus described in Example 1 145 grams of 1,1-bis(isocyanatocyclohexyl)methane, 150 grams of 2-(N-methylcarbamyl) oxyethyl acrylate as diluent and 0.4 gram of dibutyl tin dilaurate as catalyst. The mixture was heated with stirring to 40° C. for about 30 minutes and 66 grams of 2-hydroxyethyl acrylate was added dropwise over a 13 minute period and reacted. After this reaction, 139 grams of poly($\epsilon$-caprolactone) tetrol having a hydroxyl number of 223 mg.KOH/g. was added dropwise over a 10 minute period. The reaction mixture was then heated at from 40° C. to 50° C. for twenty hours. The product acrylate capped polycaprolactone urethane made in this example was successfully formulated by addition of α,α-diisobutoxyacetophenone as photoinitiator to yield a radiation curable coating.

EXAMPLE 3

There were charged to the apparatus described in Example 1 283 grams of 1,1-bis(4-isocyanatocyclohexyl)methane, 300 grams of 2-(N-methylcarbamoyl) oxyethyl acrylate as diluent and 0.8 gram dibutyl tin dilaurate as catalyst. The mixture was heated with stirring to 40° C. for about 30 minutes followed by the dropwise addition of 130 grams of 2-hydroxyethyl acrylate over a 14 minute period and reacted. After completion of this reaction and while the mixture was stirred and kept at from 45° C. to 47° C., 287 grams of a caprolactone polyol having an average molecular weight of 530 and a hydroxyl number of 212 mg.KOH/g. was added dropwise over a 20 minute period. The reaction mixture was then heated at from 40° C. to 60° C. for twenty-four hours. The acrylate capped polycaprolactone urethane produced had a Brookfield viscosity of 27,700 cps at 25° C. Comparison with Experiment C, which contained the same components, indicated that the acrylated urethane product made by the process of this invention had a viscosity 18.5 percent lower than that of the product obtained using the heretofore known process.

EXAMPLE 4

There were charged to a 500 ml four-neck round bottom flask equipped with a mechanical stirrer, dropping funnel and cooling water bath 11.1 grams of isophorone diisocyanate and 5 drops of dibutyl tin dilaurate as catalyst. There was then added dropwise over a 7 minute period 7.0 grams of 2-hydroxyethyl acrylate and the mixture was stirred at ambient temperature for sixteen hours. After this there was added over about a 30 minute period, 50 grams of a silicone polyol having a viscosity at 25° C. of 350 cks, a specific gravity at 25° C. of 1.06 and a hydroxyl number of 200 mg.KOH/g, The reaction mixture was stirred at ambient temperature for twenty-hour hours. The acrylate capped siloxane urethane produced had a viscosity of 800 cks at 100° F.

For comparative purposes, there were charged to the above-described apparatus 11.1 grams of isophorone diisocyanate and 5 drops of dibutyl tin dilaurate; the solution was stirred and 50 grams of the same silicone polyol as used above was added. The reaction mixture was stirred for three hours and displayed a distinct increase in viscosity. The material was allowed to stand overnight for sixteen hours during which time it had solidified to a solid mass.

This example demonstrates that use of the process of this invention enables one to synthesize certain acrylated urethanes which could not be synthesized using the heretofore known conventional methods.

What is claimed is:

1. A process for the production of low viscosity acrylated urethanes comprising of steps of:
   (a) initially reacting a hydroxyalkyl acrylate of the formula

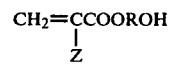

wherein Z is hydrogen or methyl and R is divalent alkylene having from 2 to 6 carbon atoms with a polyisocyanate from the group consisting of toluene diisocyanate, 1,1-bis(4-isocyanatocyclohexyl) methane and isophorone diisocyanate, to produce a prepolymer having free isocyanate groups,
   (b) subsequently reacting the prepolymer reaction product of step (a) with a polyol having an average molecular weight of from 60 to 6000 and from 2 to 6 hydroxyl groups, and
   (c) recovering the acrylated urethane reaction product mixture produced.

2. A process as claimed in claim 1 wherein the reactions are carried out at temperatures of from 10° C. to 90° C.

3. A process as claimed in claim 1 wherein said hydroxyalkyl acrylate is 2-hydroxyethyl acrylate.

4. A process as claimed in claim 1 wherein said polyol is a polycaprolactone polyol having from 2 to 6 hydroxyl groups in the molecule.

5. A process as claimed in claim 4 wherein said polycaprolactone is a diol having an average molecular weight of 290 to 5000.

6. A process as claimed in claim 4 wherein said polycaprolactone is a triol having an average molecular weight of 290 to 5000.

7. A process as claimed in claim 4 wherein said polycaprolactone is a tetrol having an average molecular weight of 290 to 5000.

8. A process as claimed in claim 1 wherein said polyol is a silicone polyol having an average molecular weight of 290 to 5000.

* * * * *